(12) United States Patent
Brad

(10) Patent No.: US 8,605,456 B2
(45) Date of Patent: Dec. 10, 2013

(54) ELECTRONIC APPARATUS

(75) Inventor: Chiu Brad, Taipei (TW)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 12/878,835

(22) Filed: Sep. 9, 2010

(65) Prior Publication Data

US 2011/0080716 A1     Apr. 7, 2011

(30) Foreign Application Priority Data

Oct. 2, 2009   (JP) ................................. 2009-230889

(51) Int. Cl.
*H05K 1/11*     (2006.01)
*H05K 1/14*     (2006.01)
*H05K 7/14*     (2006.01)
*H05K 7/18*     (2006.01)
*H05K 1/00*     (2006.01)
*H01R 12/00*    (2006.01)

(52) U.S. Cl.
USPC ........... 361/787; 361/784; 361/785; 361/790; 361/796; 361/801; 439/65

(58) Field of Classification Search
USPC ............ 174/15.2, 16.3, 35 R, 35 CG, 35 MS, 174/252, 259–266, 354; 361/679.5, 683, 361/685, 687, 689, 690–694, 695, 697, 699, 361/700, 704, 707–712, 717–719, 722, 726, 361/727, 730, 732, 736, 737, 740, 747, 748, 361/752, 753, 754, 756, 759, 760, 761, 776, 361/785, 796, 799, 800, 801, 802, 803, 804, 361/807–810, 816, 818, 825, 784, 786, 787, 361/788, 789, 790, 791, 792; 248/316.7, 248/505, 510, 560, 561; 439/65–69, 76.2, 439/157, 330, 377, 325–328, 92, 95, 55, 64, 439/862, 159, 160, 73, 74; 211/26; 312/223.2; 165/80.3, 122–126, 185; 257/704–727, 737, 738, 778; 24/295, 24/336, 457, 458; 29/602.1, 841, 854, 29/592.1, 832; 52/511, 517; 428/457, 463
See application file for complete search history.

(56) References Cited

U.S. PATENT DOCUMENTS 3,277,230 A * 10/1966 Stickney et al. ............... 174/354
6,022,234 A *  2/2000 Shinoto et al. ................ 439/327
(Continued)

FOREIGN PATENT DOCUMENTS

JP      49-50510 U     5/1974
JP      62-40885 U     3/1987
(Continued)

OTHER PUBLICATIONS

Information Sheet.
Japanese Office Action for corresponding Japanese Application No. 2009-230889, mailed Jun. 18, 2013, in 10 pages.

*Primary Examiner* — Hoa C Nguyen
*Assistant Examiner* — Binh Tran
(74) *Attorney, Agent, or Firm* — Knobbe, Martens, Olson & Bear LLP

(57) ABSTRACT

According to one embodiment, an electronic apparatus includes a case, a main circuit board in the case, a connector on the main circuit board, an auxiliary circuit board includes one end portion connected to the connector and an extending portion extending outside the main circuit board, and a spring supporting mechanism between the case and the extending portion of the auxiliary circuit board. The spring supporting mechanism includes a spring portion configured to support the extending portion elastically deformable in a direction across a surface of the auxiliary circuit board, and is fixed to the extending portion to prevent the auxiliary circuit board from moving along the surface thereof.

11 Claims, 8 Drawing Sheets

(56) References Cited

U.S. PATENT DOCUMENTS

| | | | |
|---|---|---|---|
| 6,212,069 B1* | 4/2001 | Janik et al. | 361/679.47 |
| 6,544,047 B2* | 4/2003 | Moore | 439/95 |
| 6,574,101 B2* | 6/2003 | Tanaka et al. | 361/679.5 |
| 6,621,715 B2 | 9/2003 | Kitadai | |
| 6,816,388 B2* | 11/2004 | Junkins et al. | 361/801 |
| 2005/0231918 A1* | 10/2005 | Goldmann | 361/704 |
| 2006/0146499 A1* | 7/2006 | Reents | 361/704 |
| 2007/0004240 A1* | 1/2007 | Dibene et al. | 439/66 |

FOREIGN PATENT DOCUMENTS

| | | |
|---|---|---|
| JP | 04-59196 | 5/1992 |
| JP | 05-55574 | 7/1993 |
| JP | 09-266389 | 10/1997 |
| JP | 10-112589 A | 4/1998 |
| JP | 2000-294962 | 10/2000 |

* cited by examiner

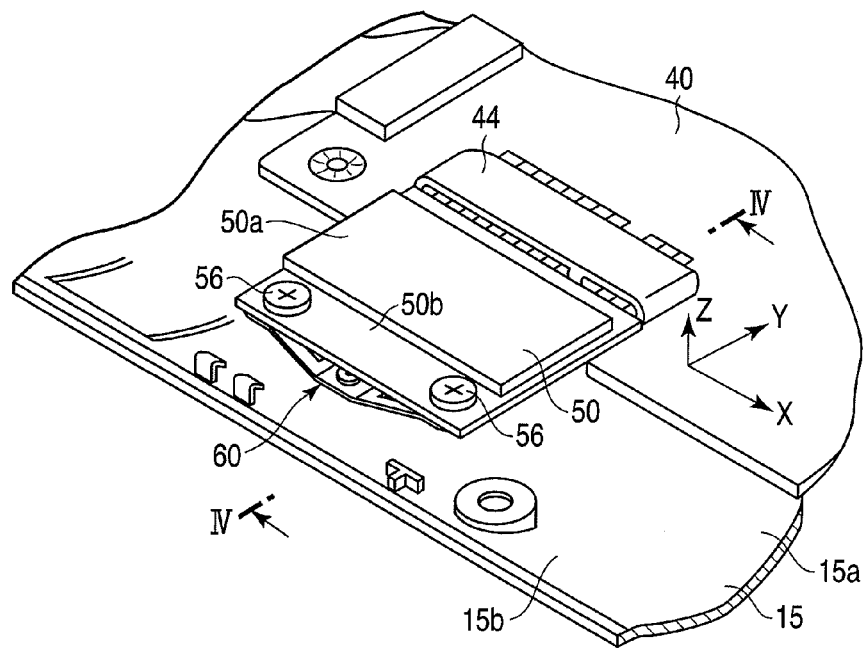
F I G. 3
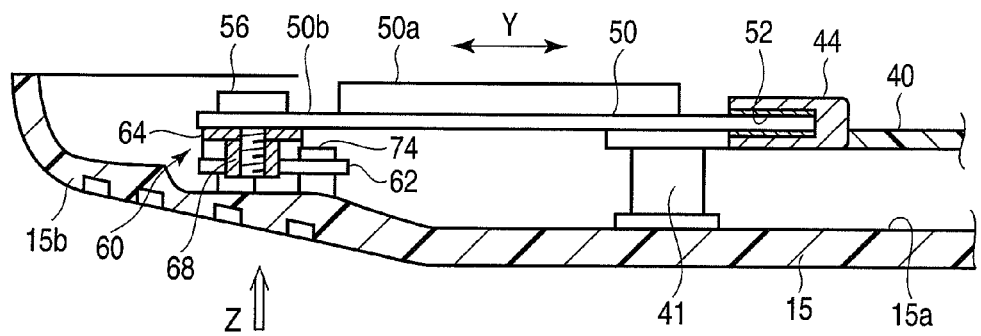
F I G. 4

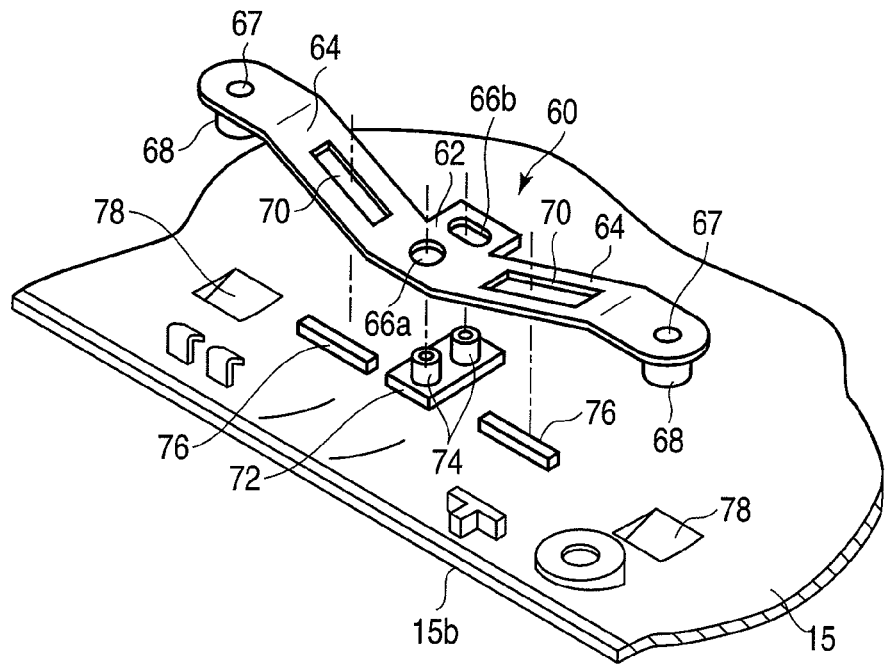
F I G. 7
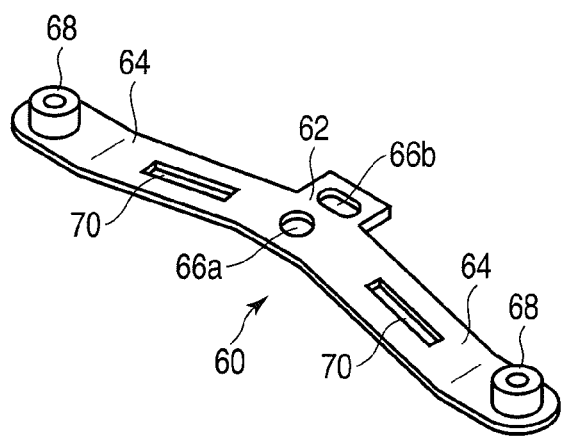
F I G. 8

ELECTRONIC APPARATUS

CROSS-REFERENCE TO RELATED APPLICATIONS

This application is based upon and claims the benefit of priority from Japanese Patent Application No. 2009-230889, filed Oct. 2, 2009; the entire contents of which are incorporated herein by reference.

FIELD

Embodiments described herein relate generally to an electronic apparatus comprising a main circuit board contained in a case and an auxiliary circuit board connected to the main circuit board.

BACKGROUND

An electronic apparatus, such as a notebook personal computer (notebook PC), comprises a case that forms an outer wall, various electronic components arranged in the case, storage device, etc.

Normally, a main circuit board is disposed in the case and fixed by screws to bosses that protrude from the inner surface of the case. Further, various types of connectors, as well as a large number of electronic components, are mounted on the main circuit board. One end of an auxiliary circuit board, such as a memory module, is connected to a connector, while the other end is supported on the main circuit board. Furthermore, a control panel mounting structure is proposed in, for example, Jpn. UM Appln. KOKAI Publication No. 5-55574. According to this mounting structure, one end of an auxiliary circuit board is connected to a connector mounted on a main circuit board, and the other end is supported by a reinforcement metal fitting fixed to the main circuit board. A board mounting structure is proposed in, for example, Jpn. UM Appln. KOKAI Publication No. 4-59196. According to this structure, one end of an auxiliary circuit board is connected to a connector mounted on a main circuit board, and the other end is held by springs without using screws.

With recent miniaturization of electronic equipment, many circuit boards have become limited in installation space. For example, there may be a situation that no space for the auxiliary circuit board can be secured on the main circuit board and that one end of the auxiliary circuit board is connected to the connector mounted on an end edge of the main circuit board and the other end is supported on the case outside the main circuit board. Specifically, the one and the other ends of the auxiliary circuit board are fixed to the main circuit board and case, respectively. In this case, if the case is deformed by a load and displaced with respect to the main circuit board, for example, the auxiliary circuit board is displaced relative to the main circuit board in the position of the connector. Thus, a connection failure may occur between the connector and auxiliary circuit board.

In the case where the other end portion of the auxiliary circuit board is supported by the springs only, the auxiliary circuit board cannot be stably supported if a load is applied to the case or main circuit board. Thus, the load may act on a junction between the connector and auxiliary circuit board.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary perspective view showing how a main circuit board and auxiliary circuit board of the personal computer are connected;

FIG. 4 is an exemplary sectional view of the personal computer taken along line IV-IV of FIG. 3;

FIG. 7 is an exemplary exploded perspective view showing the spring supporting member and a mounting portion of the case;

FIG. 8 is an exemplary perspective view showing the reverse side of the spring supporting member;

DETAILED DESCRIPTION

Various embodiments will be described hereinafter with reference to the accompanying drawings. In general, according to one embodiment, an electronic apparatus comprises: a case; a main circuit board in the case; a connector on the main circuit board; an auxiliary circuit board comprising one end portion connected to the connector and an extending portion extending outside the main circuit board; and a spring supporting mechanism between the case and the extending portion of the auxiliary circuit board, comprising a spring portion configured to support the extending portion elastically deformable in a direction across a surface of the auxiliary circuit board, and fixed to the extending portion to prevent the auxiliary circuit board from moving along the surface thereof.

Figure 1:
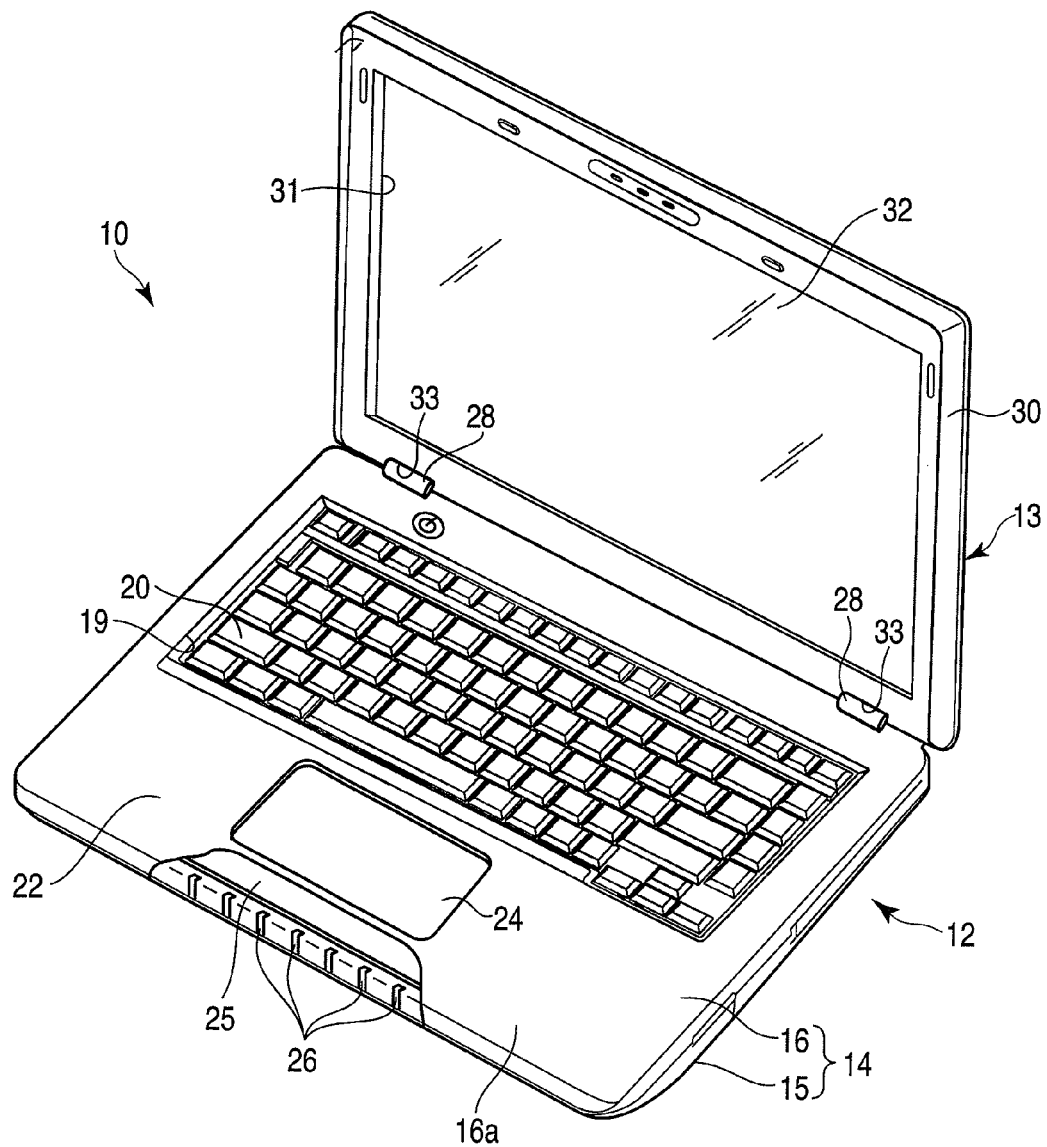
FIG. 1 is an exemplary perspective view showing a personal computer according to a first embodiment.
Figure 2:
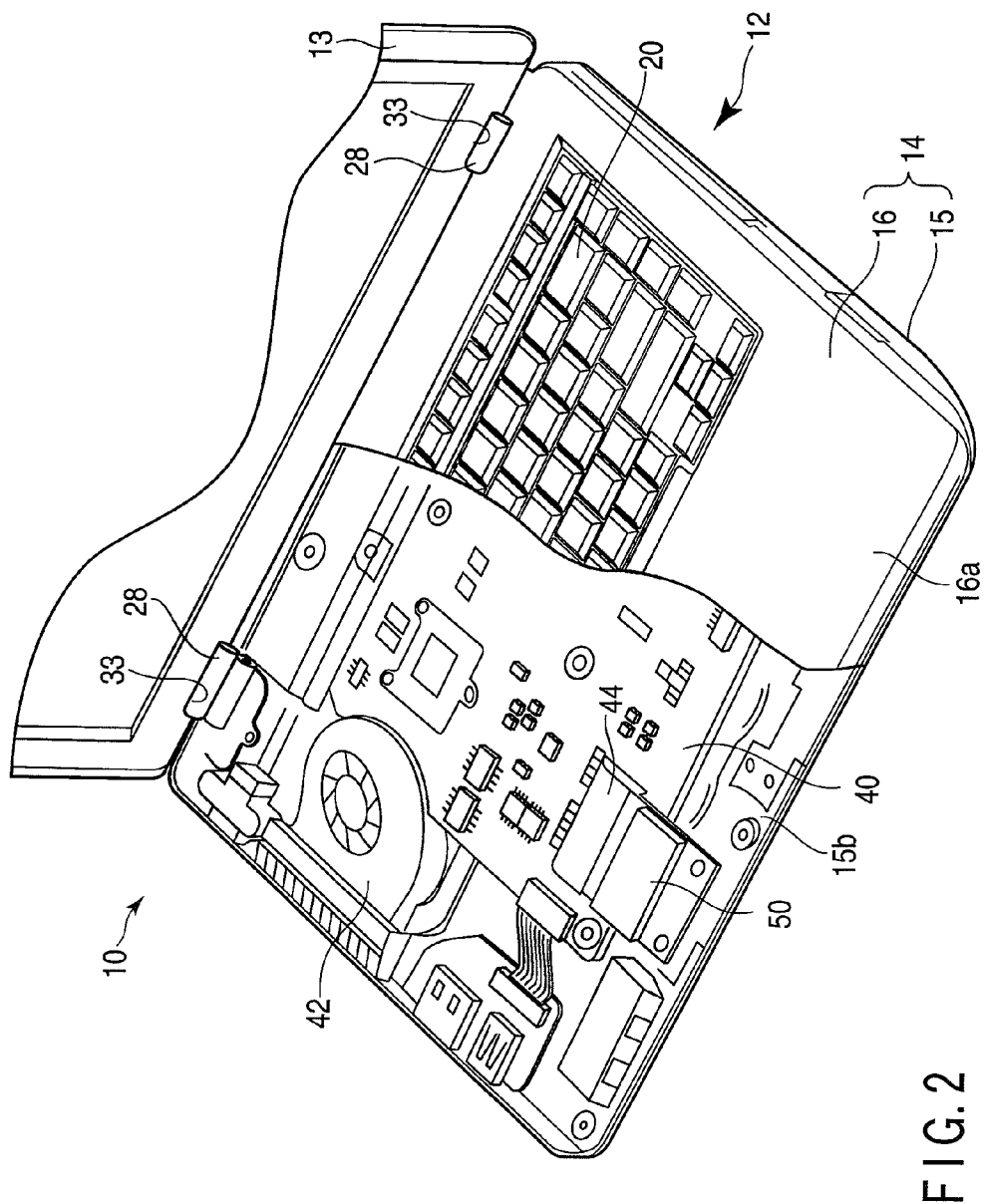
FIG. 2 is an exemplary perspective view showing the interior of a case of the personal computer with its top cover partially cutaway.

Electronic apparatuses according to embodiments will now be described in detail with reference to the accompanying drawings. FIG. 1 shows a personal computer as an electronic apparatus according to a first embodiment, FIG. 2 is an exemplary cutaway perspective view showing the interior of a case of the personal computer, and FIG. 3 is an exemplary enlarged perspective view showing a main circuit board and auxiliary circuit board.

As shown in FIG. 1, a personal computer 10 comprises an apparatus main body 12 and display unit 13 supported on the main body. The main body 12 comprises a case 14. The case 14 is in the form of a flat box, comprising a rectangular base 15 and substantially rectangular upper cover 16 fitted to the base. The case 14 is formed of, for example, a synthetic resin.

A substantially rectangular opening 19 is formed covering the central and rear-half portions of the upper cover 16, and a supporting metal sheet (not shown) and keyboard 20 are exposed in the opening. A substantially front-half portion of the cover 16 forms a palmrest 22. An operating area 24 and click switch 25 for operating a pointing device are arranged on the central part of the palmrest 22. A plurality of indicators 26 configured to indicate operating conditions of the personal computer 10 are disposed on a front end portion 16a of the upper cover 16. A pair of lugs 28 are arranged on the rear end portion of the cover 16 so as to be spaced transversely relative to the case 14.

The display unit 13 comprises a flat, rectangular display housing 30 and a liquid-crystal display panel 32 contained in the display housing. A display window portion 31 is formed on a front wall of the display housing 30. The window portion 31 has a size that covers the greater part of the front wall. A display screen of the display panel 32 is exposed to the outside of the display housing 30 through the window portion 31.

The display housing 30 comprises a pair of connecting recesses 33 at its one end portion. The connecting recesses 33 are spaced apart from each other transversely relative to the display housing 30 and engage with the lugs 28 of the case 14, individually. The display housing 30 are pivotably supported on the case 14 by the connecting recesses 33 and hinges (not shown) in the lugs 28.

Thus, the display unit 13 is pivotable between closed and open positions. In the closed position, the display unit 13 is brought down to cover the top surface of the case 14, including the palmrest 22 and keyboard 20, from above. In the open position, the display unit 13 is raised to expose the liquid-crystal display panel 32 and the top surface of the case. The display unit 13 of the personal computer shown in FIG. 1 is in the open position.

As shown in FIG. 2, a main printed circuit board (motherboard) 40, cooling fan 42, various connectors, a secondary cell (not shown), etc., are arranged in the case 14. The main printed circuit board 40 is fixed by screws to a plurality of bosses 41 (FIG. 4), which are provided on a bottom surface 15a of the base 15, and is opposed to the bottom surface of the base in a parallel relationship with a gap therebetween. Further, the circuit board 40 includes a region below the keyboard 20 and spreads over about half the area of the base 15. A large number of electronic components are mounted on the board 40. Furthermore, a connector 44 for the connection of the auxiliary circuit board is mounted near the peripheral edge of the board 40.

Figure 5:
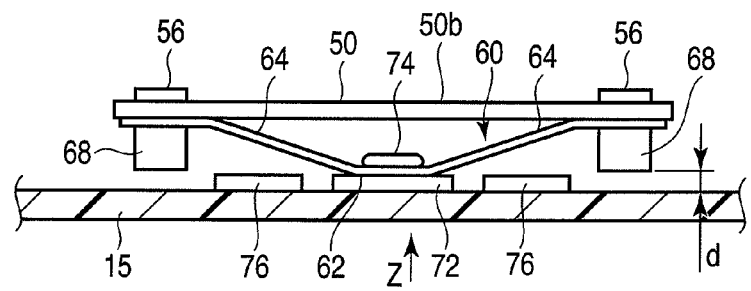
FIG. 5 is an exemplary front view showing how the auxiliary circuit board is supported by a spring supporting member.

FIG. 3 shows how the main printed circuit board 40 and auxiliary circuit board of the personal computer are connected; FIG. 4 is an exemplary sectional view of the personal computer taken along line IV-IV of FIG. 3; FIG. 5 is an exemplary front view showing how the auxiliary circuit board is supported by a spring supporting member; and FIG. 6 is an exemplary exploded perspective view showing the main printed circuit board, auxiliary circuit board, and spring supporting member.

As shown in FIGS. 2 to 4, one end of an auxiliary circuit board 50, e.g., a wireless LAN, is connected to the connector 44 mounted on the main printed circuit board 40. The auxiliary circuit board 50 extends outwardly relative to the main printed circuit board 40 from the connector 44, and its extended portion is elastically supported by a spring supporting member 60 on the bottom surface of the base 15 and prevented from moving relative to the surface of the board 50.

Figure 6:
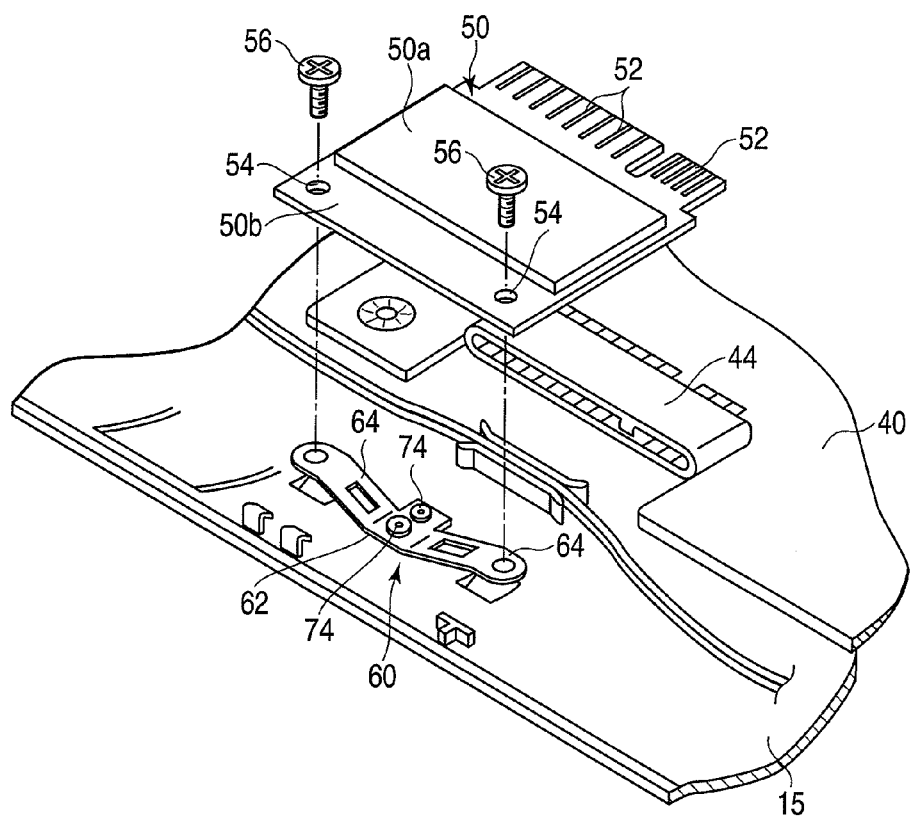
FIG. 6 is an exemplary exploded perspective view showing the main circuit board, auxiliary circuit board, and spring supporting member.

As shown in FIG. 6, the auxiliary circuit board 50 is rectangular and a plurality of connection terminals 52 are formed on its one end portion. A flat box-like electronic component 50a is mounted on the central part of the auxiliary circuit board 50, and a pair of through-holes 54 are formed in the other end portion of the board 50. In the auxiliary circuit board 50, as shown in FIGS. 3 to 6, the one end on which the connection terminals 52 are formed is fitted into the connector 44 of the main printed circuit board 40 so that it is connected electrically and mechanically to the board 40.

The auxiliary circuit board 50 extends outwardly relative and substantially parallel to the main printed circuit board 40 from the connector 44. An extended end portion or other end portion 50b of the auxiliary circuit board 50, which is located outside the main printed circuit board 40, is elastically supported by the spring supporting member 60 on the bottom surface of the base 15. Further, a pair of fixing screws 56 are screwed into the spring supporting member 60 through the through-holes 54 of the auxiliary circuit board 50, individually. Thus, the other end portion 50b of the auxiliary circuit board 50 is fixed to the spring supporting member 60 by the screws.

As shown in FIGS. 4 to 8, the spring supporting member 60 that constitutes a spring supporting mechanism is formed of a metal plate spring. The supporting member 60 integrally comprises a rectangular fixed portion 62 located in its central part and a pair of arm portions 64 obliquely bilaterally extending from the fixed portion. A circular through-hole 66a and slot-like through-hole 66b are formed in the fixed portion 62. A through-hole 67 is formed in a free end of each arm portion 64 that functions as a spring portion. A nut 68 is integrally fixed to one surface (on the base side in this case) of the free end and aligned with its corresponding through-hole 67. The nut 68 is in the form of a circular column having a threaded hole in its center. A positioning hole 70 is formed in the middle of each arm portion 64. The positioning hole 70 is used in fixing the spring supporting member 60 to the base 15.

As shown in FIGS. 4 to 7, a rectangular seat 72 is formed on the bottom surface of the base 15, and two columnar fixing pins 74 protrude substantially vertically upward from the seat. On the bottom surface of the base 15, elongated rectangular positioning projections 76 protrudes individually from the opposite sides of the fixing pins 74. Further, flat-bottomed recesses 78 are formed outside these positioning projections, individually.

The fixed portion 62 of the spring supporting member 60 is placed on the seat 72 in such a manner that the fixing pins 74 are passed individually through the through-holes 66a and 66b of the fixed portion 62. Further, the fixed portion 62 is fixed to the bottom surface of the base 15 by welding respective extended ends of the pins 74. In fixing the fixed portion 62 to the base 15, the spring supporting member 60 is positioned relative to the base 15 by engaging the positioning projections 76 on the base 15 individually with the positioning holes 70 in the arm portions 64. With the fixed portion 62 fixed to the base 15, the pair of arm portions 64 extend upward from the fixed portion, that is, away from the bottom surface of the base 15. Thus, the arm portions 64 are elastically deformable relative to the fixed portion 62, that is, to the base 15. In this arrangement, each arm portion 64 is elastically deformable substantially at right angles to the bottom surface of the base 15. The nuts 68 fixed to the respective free ends of the arm portions 64 face the bottom surface of the base 15 across a predetermined space d of, for example, 0.3 to 0.5 mm. The nuts 68 also function as stoppers that prevent excessive elastic deformation of the arm portions 64.

As shown in FIGS. 3 to 6, the other end portion 50*b* of the auxiliary circuit board 50 is placed on the respective free end portions of the arm portions 64 of the spring supporting member 60 and further fixed to the free end portions of the arm portions by the fixing screws 56. Each fixing screw 56 is screwed into its corresponding nut 68 through the through-holes 54 and 67 of the auxiliary circuit board 50 and the arm portion 64 corresponding thereto. Thus, the other end portion 50*b* of the auxiliary circuit board 50 is supported substantially flush with the connector 44 by the spring supporting member 60, and the auxiliary circuit board 50 is held substantially parallel to the main printed circuit board 40. Further, the arm portions 64 of the spring supporting member 60 are elastically deformable substantially at right angles to the bottom surface of the base 15, that is, to the surface of the auxiliary circuit board 50. If the base 15 is deformed by an external force, therefore, the elastic deformation of the arm portions 64 absorbs this, thereby preventing the other end portion 50*b* of the board 50 from being displaced. The arm portions 64 are elastically deformed if the base 15 is deformed inwardly relative to the case 14 by an external force that acts on its peripheral edge portion, especially that part on which the spring supporting member 60 is disposed, as indicated by arrow Z in FIGS. 4 and 5, for example. Thereupon, only the fixed portion 62 is displaced, and the free end portions of the arm portions 64 and the other end portion 50*b* of the auxiliary circuit board 50 fixed thereto are held in a predetermined position without being displaced.

Furthermore, the spring supporting member 60 can hardly be elastically deformed parallel to the surface of the auxiliary circuit board 50. As the other end portion 50*b* of the board 50 is attached to the supporting member 60 by the screws, therefore, it is prevented by the member 60 from moving along the surface of the board 50, that is, in the X- and Y-directions. Thus, the auxiliary circuit board 50 is inhibited from moving unexpectedly, especially away from the connector 44, and securely kept connected to the connector 44.

Respective front end portions 15*b* and 16*b* of the base 15 and upper cover 16 are often held by a user who carries the personal computer 10 with him/her and are easily subjected to an external force. If the other end portion 50*b* of the auxiliary circuit board 50 is located near the front end portions 15*a* and 16*a* of the base 15 and upper cover 16, an external force is liable to act on the auxiliary circuit board 50, in particular. If the spring supporting member 60 is located near the front end portions 15*a* and 16*a* of the base 15 and upper cover 16 in like manner, however, the arm portions 64 of the spring supporting member 60 are elastically deformed, thereby absorbing the influence of the external force. Consequently, the other end portion 50*b* of the auxiliary circuit board 50 can be prevented from being displaced.

According to these circumstances, the auxiliary circuit board 50 can be stably supported by the spring supporting member 60. If the case 14 is deformed, moreover, the board 50 can be prevented from being displaced. Consequently, a load can be prevented from acting on a junction between the board 50 and connector 44, so that connection of these members can be stably maintained without a failure. Thus, an electronic apparatus improved reliability can be obtained.

The following is a description of a personal computer according to another embodiment.

Figure 9:
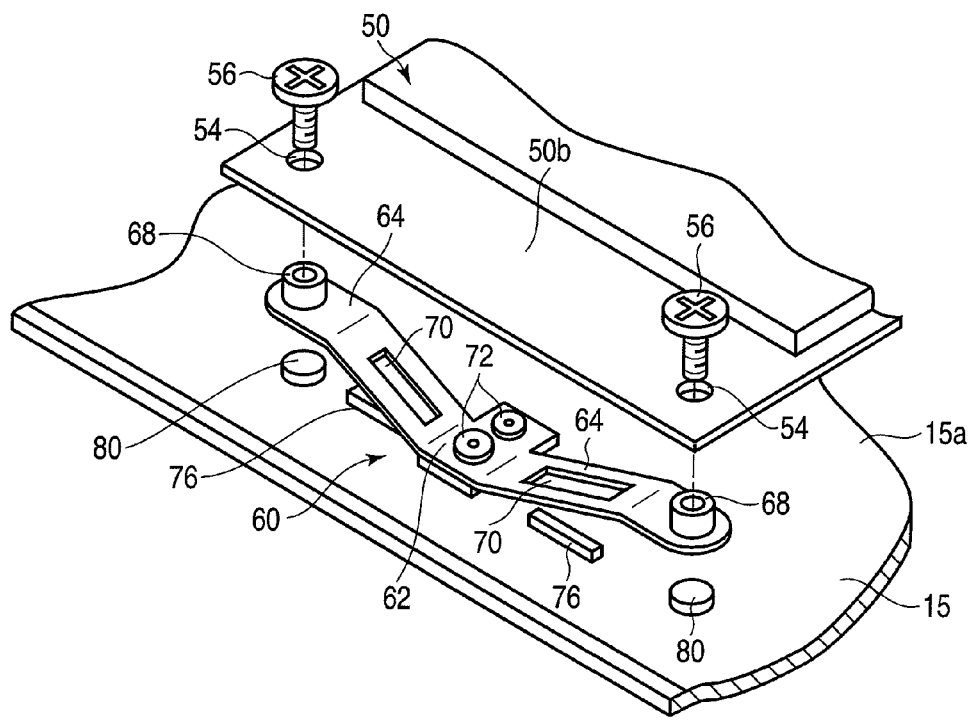
FIG. 9 is an exemplary exploded perspective view showing a spring supporting member and auxiliary circuit board of a personal computer according to a second embodiment.
Figure 10:
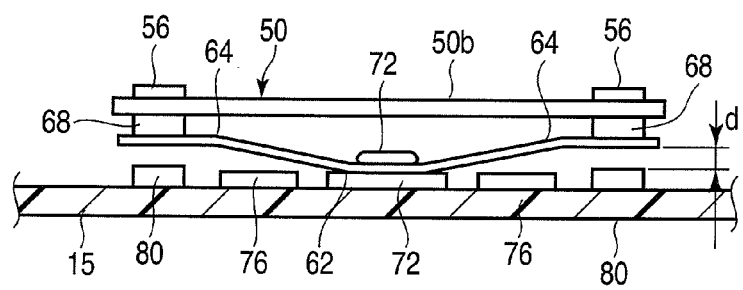
FIG. 10 is an exemplary front view showing how the auxiliary circuit board is supported by the spring supporting member according to the second embodiment.

FIGS. 9 and 10 show a spring supporting mechanism of a personal computer according to the second embodiment. According to the second embodiment, a spring supporting member 60 formed of a metal plate spring comprises a fixed portion 62 and two arm portions 64 bilaterally extending from the fixed portion. A nut 68 is fixed to a surface of a free end of each arm portion 64 on the side of an auxiliary circuit board 50. The fixed portion 62 is fixed to the bottom surface of a base 15 of a case 14 by fixing pins 74.

Two columnar stops 80 are formed on the bottom surface of the base 15 of the case 14 and face the respective free ends of the arm portions 64 with a predetermined gap d therebetween. The stops 80 prevent excessive elastic deformation of the arm portions 64. One end of the auxiliary circuit board 50 is connected to a connector 44 on a main circuit board, and the other end portion 50*b* is fixed to respective free end portions of the arm portions 64 of the spring supporting member 60 by two fixing screws 56.

In the second embodiment, other configurations are the same as those of the foregoing first embodiment, so that like reference numbers are used to designate like parts throughout the several views, and a detailed description of those parts is omitted. Also in the second embodiment, the auxiliary circuit board 50 can be stably supported by the spring supporting member 60, so that a connection failure between the board 50 and connector 44 can be prevented. Thus, an electronic apparatus with improved reliability can be obtained.

Figure 11:
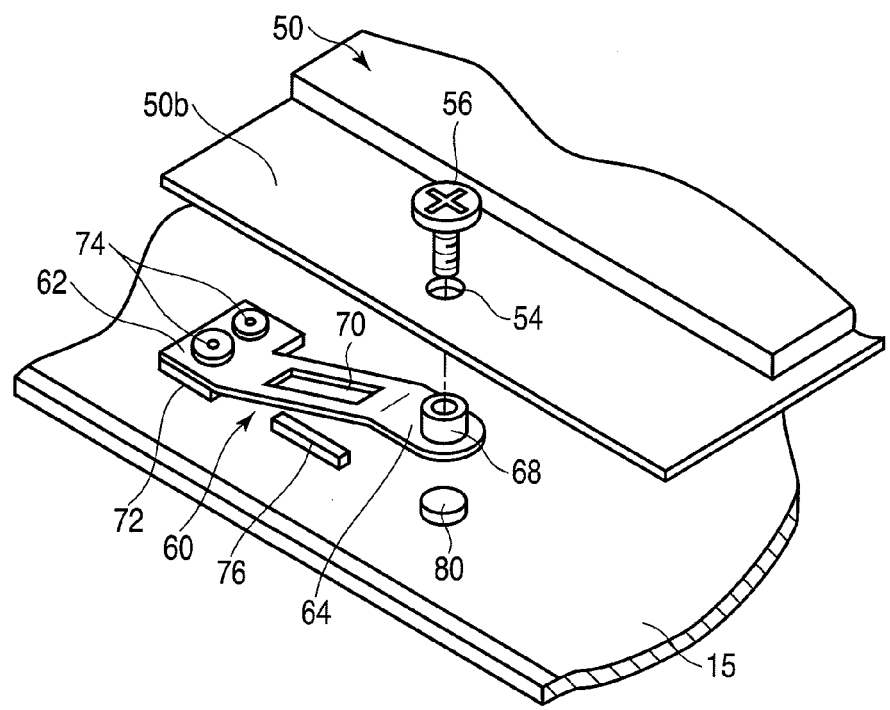
FIG. 11 is an exemplary exploded perspective view showing a spring supporting member and auxiliary circuit board of a personal computer according to a third embodiment.
Figure 12:
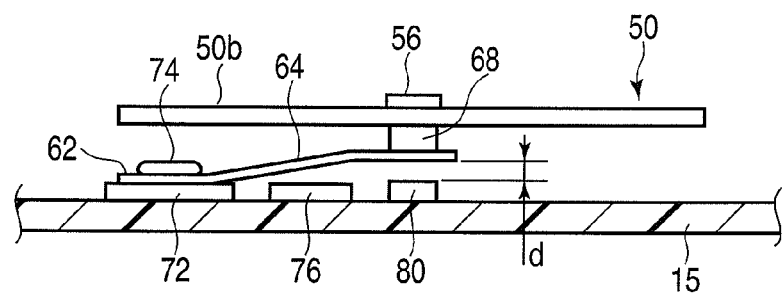
FIG. 12 is an exemplary front view showing how the auxiliary circuit board is supported by the spring supporting member according to the third embodiment.

FIGS. 11 and 12 show a spring supporting mechanism of a personal computer according to a third embodiment. According to the third embodiment, a spring supporting member 60 formed of a metal plate spring comprises a fixed portion 62 and a single arm portion 64 unilaterally extending from the fixed portion. A nut 68 is fixed to a surface of a free end of the arm portion 64 on the side of an auxiliary circuit board 50. The fixed portion 62 is fixed to the bottom surface of a base 15 of a case 14 by fixing pins 74.

A columnar stop 80 is formed on the bottom surface of the base 15 of the case 14 and face the free end of the arm portion 64 with a predetermined gap d therebetween. The stop 80 prevents excessive elastic deformation of the arm portion 64. One end of the auxiliary circuit board 50 is connected to a connector 44 on a main circuit board, and a central part of the other end portion 50*b* is fixed to a free end portion of the arm portion 64 of the spring supporting member 60 by a fixing screw 56.

In the third embodiment, other configurations are the same as those of the foregoing first embodiment, so that like reference numbers are used to designate like parts throughout the several views, and a detailed description of those parts is omitted. Also in the third embodiment, the auxiliary circuit board 50 can be stably supported by the spring supporting member 60, so that a connection failure between the board 50 and connector 44 can be prevented. Thus, an electronic apparatus with improved reliability can be obtained. According to the third embodiment, moreover, the spring supporting member 60 can be made more compact to allow a reduction in installation space.

Figure 13:
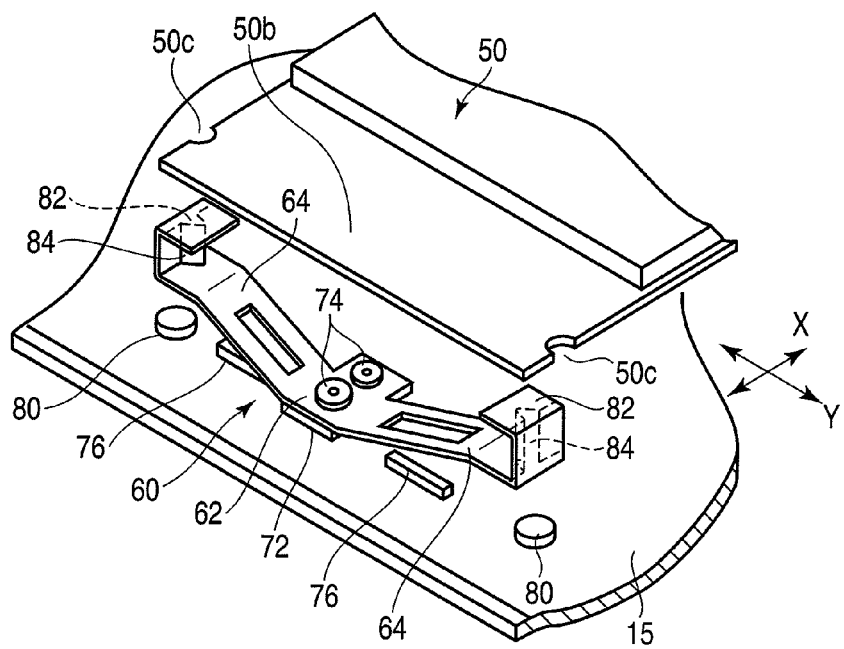
FIG. 13 is an exemplary exploded perspective view showing a spring supporting member and auxiliary circuit board of a personal computer according to a fourth embodiment.
Figure 14:
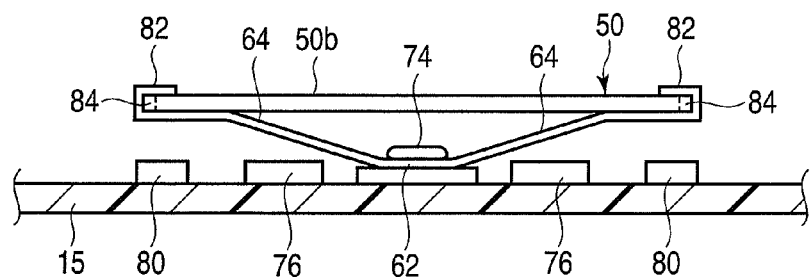
FIG. 14 is an exemplary front view showing how the auxiliary circuit board is supported by the spring supporting member according to the fourth embodiment.

FIGS. 13 and 14 show a spring supporting mechanism of a personal computer according to a fourth embodiment. According to the fourth embodiment, an auxiliary circuit board 50 and a spring supporting member, which constitutes the spring supporting mechanism, are fixed by combining engagement projections and notches, not by screws. Specifically, a spring supporting member 60 formed of a metal plate spring comprises a fixed portion 62 and two arm portions 64 bilaterally extending from the fixed portion. A free end of each arm portion 64 is bent substantially into a U-shape to form a holding portion 82, and an engagement projection 84 is formed inside the holding portion 82. The engagement projection 84 extends at right angles to a surface of the auxiliary circuit board 50. The fixed portion 62 of the spring supporting member 60 is fixed to the bottom surface of a base 15 of a case 14 by fixing pins 74.

Two columnar stops 80 are formed on the bottom surface of the base 15 of the case 14 and face the respective free ends of the arm portions 64 with a predetermined gap therebetween. The stops 80 prevent excessive elastic deformation of the arm portions 64. One end of the auxiliary circuit board 50 is connected to a connector 44 on a main circuit board, and the other end portion 50b is held by respective free end portions of the arm portions 64 of the spring supporting member 60. Specifically, engagement notches 50c are formed individually in the opposite side edges of the other end portion 50b. Each side edge of the other end portion 50b is held from above and below by the holding portion 82 of its corresponding arm portion 64, whereby it is prevented from moving at right angles to the surface of the auxiliary circuit board 50 and in the Y-direction. Further, the respective engagement projections 84 of the arm portions 64 are individually in engagement with the engagement notches 50c of the other end portion 50b. Thus, the auxiliary circuit board 50 is prevented from moving in the X-direction. As the arm portions 64 are elastically deformed, moreover, they can absorb changes in the relative positions of the base 15 and board 50.

In the fourth embodiment, other configurations are the same as those of the foregoing first embodiment, so that like reference numbers are used to designate like parts throughout the several views, and a detailed description of those parts is omitted. In the fourth embodiment, as in the first embodiment, the auxiliary circuit board 50 can be stably supported by the spring supporting member 60, so that a connection failure between the board 50 and connector 44 can be prevented. Thus, an electronic apparatus with improved reliability can be obtained. According to the fourth embodiment, moreover, the other end portion 50b of the auxiliary circuit board 50 can be easily fixed to the spring supporting member 60 without using screws.

Figure 15:
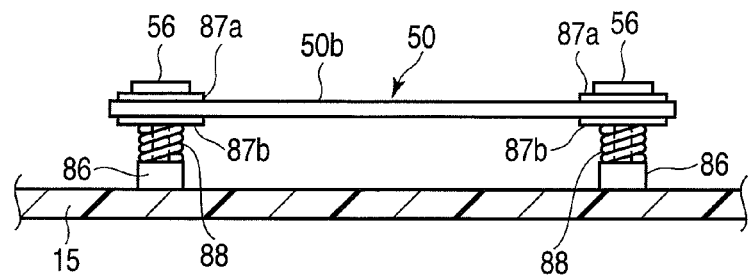
FIG. 15 is an exemplary front view showing how an auxiliary circuit board is supported by a spring supporting member according to a fifth embodiment.

FIG. 15 shows a spring supporting mechanism of a personal computer according to a fifth embodiment. According to the fifth embodiment, the spring supporting mechanism comprises two coil springs 88, which function as spring portions. On the inner surface of a base 15 of a case 14, two bosses 86 or nuts are arranged in positions opposite the other end portion 50b of an auxiliary circuit board 50. A fixing screw 56 is screwed into each boss 86 through a through-hole formed in the other end portion 50b of the board 50. Washers 87a and 87b are attached to the upper and lower surfaces, respectively, of the other end portion 50b so as to surround each corresponding fixing screw 56. Each coil spring 88 is mounted between the lower-side washer 87b and each corresponding boss 86 so as to surround each corresponding fixing screw 56. Thus, the other end portion 50b of the auxiliary circuit board 50 is supported so that changes in the relative positions of the base 15 and board 50 can be absorbed by elastic deformation of the coil springs 88. At the same time, the auxiliary circuit board 50 is prevented from moving along its surface by the fixing screws 56 and held in a predetermined position.

In the fifth embodiment, other configurations are the same as those of the foregoing first embodiment, so that like reference numbers are used to designate like parts throughout the several views, and a detailed description of those parts is omitted. In the fifth embodiment, as in the first embodiment, the auxiliary circuit board 50 can be stably supported by a spring supporting member, so that a connection failure between the board 50 and a connector 44 can be prevented. Thus, an electronic apparatus with improved reliability can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The electronic apparatus according to the present invention is not limited to personal computers but widely applicable to various types of electronic equipment, such as electronic organizers, PDAs, etc. The auxiliary circuit board is not limited to wireless LAN boards but also applicable to various other circuit boards, such as solid-state devices (SSDs), TV tuner boards, memory boards, etc.

What is claimed is:

1. An electronic apparatus comprising:
a case;
a main circuit board in the case and opposed to an inner surface of the case with a gap between the main circuit board and the inner surface;
a connector on the main circuit board;
an auxiliary circuit board arranged substantially in parallel to the main circuit board, and comprising one end portion with a connection terminal connected to the connector and an extending portion extending beyond the main circuit board, the auxiliary circuit board comprising a surface opposing to the inner surface of the case with a gap; and
a spring supporting mechanism between the inner surface of the case and the extending portion of the auxiliary circuit board, the spring supporting mechanism comprising a spring portion that is deformable in a direction perpendicular to the surface of the auxiliary circuit board and is configured to support the extending portion and is fixed to the extending portion.

2. The electronic apparatus of claim 1, wherein the spring supporting mechanism comprises a spring supporting member located between the inner surface of the case and the auxiliary circuit board, the spring supporting member comprising a fixed portion fixed to the case and an arm portion extending from the fixed portion and comprising the spring portion, and wherein the extending portion of the auxiliary circuit board is supported and fixed to a free end of the arm portion.

3. The electronic apparatus of claim 2, wherein the spring supporting member comprises a metal plate spring and a nut fixed to the free end of the arm portion, and the extending portion of the auxiliary circuit board is attached to the nut by a screw.

4. The electronic apparatus of claim 3, wherein the nut is fixed to a surface of the arm portion opposite from the auxiliary circuit board and faces the inner surface of the case with a gap therebetween, the nut constituting a stop which regulates a displacement of the arm portion.

5. The electronic apparatus of claim 3, wherein the nut is fixed to a surface of the arm portion on the side of the auxiliary circuit board, and wherein the spring supporting mechanism comprises a stop fixed to the case and opposed to the arm portion with a gap therebetween and configured to regulate a displacement of the arm portion.

6. The electronic apparatus of claim 1, wherein the spring supporting mechanism comprises a spring supporting member located between the inner surface of the case and the auxiliary circuit board, the spring supporting member comprising a fixed portion fixed to the case and two arm portions bilaterally extending from the fixed portion and each comprising the spring portion, and wherein the extending portion of the auxiliary circuit board is supported by and fixed to respective free ends of the two arm portions.

7. The electronic apparatus of claim 6, wherein the spring supporting member comprises a metal plate spring and nuts fixed individually to the free ends of the arm portions, and wherein the extending portion of the auxiliary circuit board is attached to the nuts by screws.

8. The electronic apparatus of claim 6, wherein the spring supporting member comprises
- holding portions formed individually on the respective free ends of the arm portions and configured to contact the extending portion, and
- engagement projections formed individually on respective inner surfaces of the holding portions, and wherein the extending portion of the auxiliary circuit board comprises engagement notches configured to engage individually with the engagement projections of the spring supporting member.

9. The electronic apparatus of claim 1, wherein the case comprises a base comprising a bottom surface and an upper cover fitted to the base, wherein the auxiliary circuit board is fixed to the bottom surface of the base within the case, and wherein the spring supporting mechanism is disposed between the bottom surface of the base and the auxiliary circuit board.

10. The electronic apparatus of claim 9, wherein the spring supporting mechanism is located on a front end portion of the base.

11. An electronic apparatus comprising:
- a case;
- a main circuit board in the case;
- a connector on the main circuit board;
- an auxiliary circuit board comprising one end portion connected to the connector and an extending portion extending beyond the main circuit board; and
- a spring supporting mechanism between the case and the extending portion of the auxiliary circuit board, the spring supporting mechanism comprising a spring portion that is deformable in a direction between the case and the extending portion of the auxiliary circuit board and is configured to support the extending portion and is fixed to the extending portion;
- the spring supporting mechanism comprising a spring supporting member located between an inner surface of the case and the auxiliary circuit board, the spring supporting member comprising a fixed portion fixed to the case and two arm portions bilaterally extending from the fixed portion and each comprising the spring portion, and wherein the extending portion of the auxiliary circuit board is supported by and fixed to respective free ends of the two arm portions;
- wherein the spring supporting member comprises holding portions formed individually on the respective free ends of the arm portions and configured to contact the extending portion, and
- engagement projections formed individually on respective inner surfaces of the holding portions, and wherein the extending portion of the auxiliary circuit board comprises engagement notches configured to engage individually with the engagement projections of the spring supporting member.

* * * * *